Aug. 13, 1957     C. R. ANDERSON ET AL     2,802,509
APPARATUS FOR THE FABRICATION OF RIBBED STRUCTURAL MEMBERS
Filed April 30, 1952
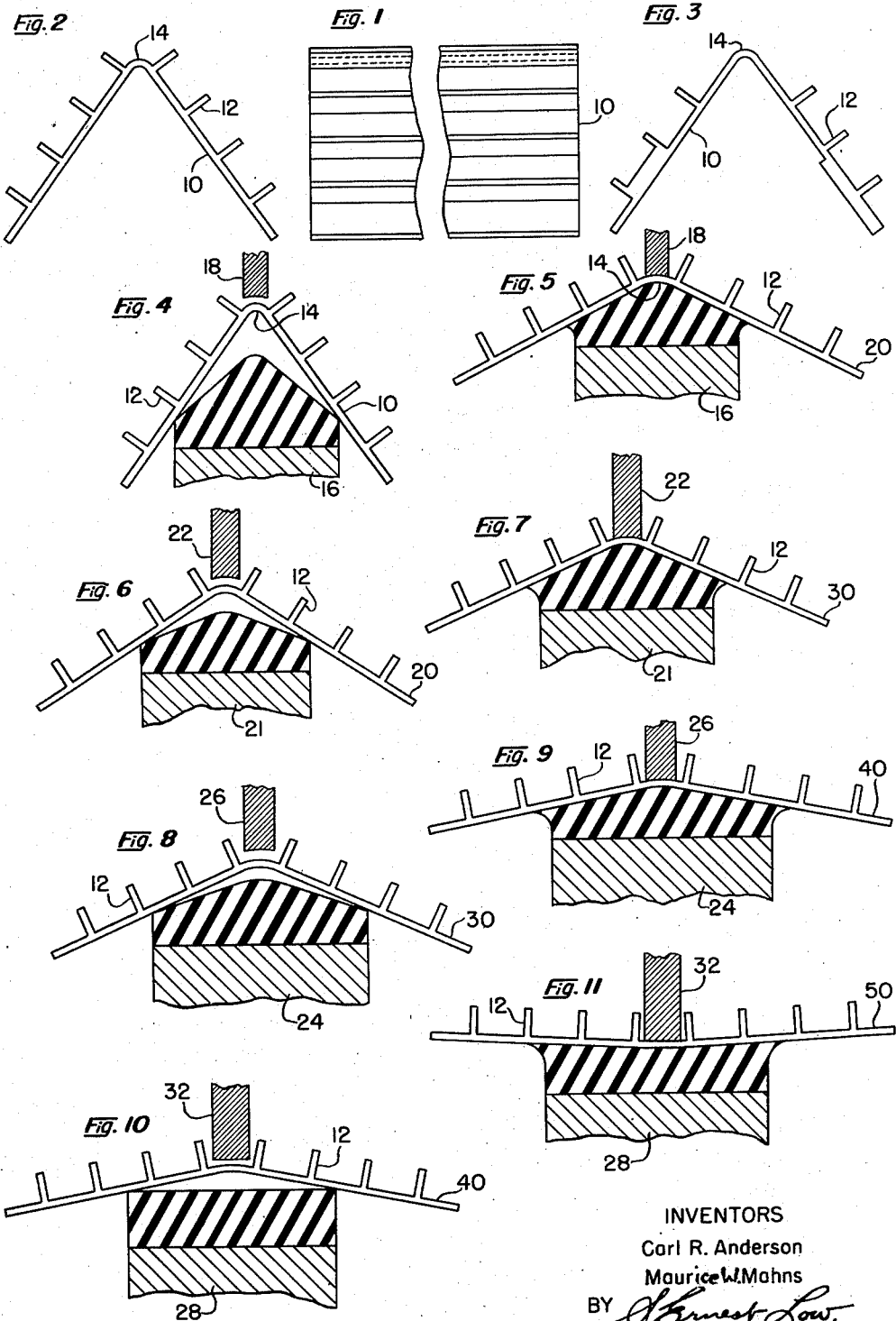
INVENTORS
Carl R. Anderson
Maurice W. Mahns
BY *J. Ernest Low*
ATTORNEY United States Patent Office 2,802,509
Patented Aug. 13, 1957

2,802,509

APPARATUS FOR THE FABRICATION OF RIBBED STRUCTURAL MEMBERS

Carl R. Anderson and Maurice W. Mahns, Lafayette, Ind., assignors to Aluminum Company of America, Pittsburgh, Pa., a corporation of Pennsylvania Application April 30, 1952, Serial No. 285,274

2 Claims. (Cl. 153—54)

The present invention relates to the manufacture of metallic structural members. It is more specifically concerned with manufacturing processes incorporating an initial extrusion operation followed by one or more metal working operations.

It is a known manufacturing procedure to produce tubular members by extrusion as products intermediate to a finally desired structural member. Such intermediate tubular extrusions are normally split or severed axially of their length and are then opened out to provide final structural members in the form of elongated plates, or the like. United States Letters Patent 2,458,686, to Robert P. Davie, Jr. is typical of the published art on the known practice referred to herein.

The production of integrally stiffened structural members, suitable for use in the design and construction of aircraft assemblies, have been attempted by the methods described in the aforementioned Davie patent. However, considerable difficulty has been experienced in the flattening operation following the initial extrusion and subsequent severing operation. Roller die and press flattening techniques have been found to produce slight concave surfaces on flattened extruded tubular members or sections immediately opposite or below their stiffener ribs.

Fabrication methods have been developed and tried to eliminate the aforesaid concave surfaces. For example, the initially extruded intermediate tubular members have been produced employing a mandrel with flat spots in registry with and below the integral stiffening ribs to provide localized flats beneath the projecting ribs on the extruded tubular sections. The flats thus provided eliminated the normally arcuate portions beneath the projecting ribs and thereby obviated a subsequent flattening operation at their particular locations. This procedure has not proved satisfactory, however, since it introduced a problem of accurately indexing and registering localized flats on the mandrel with the exterior configuration-controlling female die defining the outwardly projecting reinforcing or stiffening ribs.

It is a main object of the present invention to provide a metal fabrication process for producing integrally stiffened structural members which can be transformed from their initial cross-sectional form to a desired form in the absence of abrupt surface changes below the stiffening ribs.

Another object of the invention is to provide a metal fabrication process for producing integrally stiffened extruded sections of cross-sectional widths in excess of normally available extrusion equipment.

Other objects and advantages will present themselves on consideration of the following specification and appended drawings in which the invention is generally and specifically described and illustrated. In the drawings:

Fig. 1 represents a simple form of extruded section in side elevation, which it is desired to transform to other than its extruded shape in accordance with the practice of the present invention;

Fig. 2 represents an end elevational view of the section illustrated in Fig. 1;

Fig. 3 represents an end elevational view of a modified form of the section illustrated in Figs. 1 and 2; and Figs. 4 through 11 represent several steps and the basic equipment employed in carrying out the present invention.

In general, the invention is directed to the transformation to increase the cross-sectional width of structural members or sections, which are produced initially in the form of a web or plate member having one or more outwardly extending, integrally attached stiffening ribs, the structural members in cross-section incorporating one or more V-formations between their marginal edges, and the stiffening rib or ribs being located beyond the immediate intersection of diverging leg portions of the plate or web constituting a V-formation.

In a practical example of the invention, a member 10 having one or more integrally attached stiffening ribs 12, is extruded with at least one substantially V-formation intermediate the marginal edges of the member. The apex of the V-formation in each instance is selected in the form of an arcuate connecting link, which insures against sharp angular intersection of the diverging legs of the V, as illustrated in Figs. 2 and 3. The rib or ribs 12 are purposely located outside or beyond the arc 14, which is contiguous with the legs of the V section, and which is preferably of uniform thickness over its arcuate length. In the preferred practices of the invention the arcuate portion 14 of the extruded section 10 is produced with a minimum radius of about 1.5 $t$, where "$t$" is the maximum thickness of the web portion of the section 10 confined to the arcuate length 14 thereof. It will be understood that the web or plate portion of the section 10 may be of varying thickness, as represented in Fig. 3, and/or tapered along its axial length, if desired. In any event, the arcuate link 14 should preferably not be greater in thickness than the adjoining web thickness of section 10 in the immediate vicinity of jointure of the arcuate link and diverging legs.

Figs. 4 through 11 represent various stages in the transformation to increase the cross-sectional width of the initially extruded section 10 up to and including a substantially flat, rib-stiffened structural plate member 50. The several Figs. 4 to 11, inclusive, should be considered consecutively in pairs as substantially representing, respectively, the section before and after four progressive transforming steps.

Referring to Figs. 4 and 5, the section 10 is shown in position between a pair of spaced rolls comprising a lower deformable roll and an upper non-deformable roll. The lower roll 16 preferably consists of a rigid hub capped with rubber, or other suitable deformable material, and the upper roll 18 is preferably selected in the form of a concave or grooved, relatively non-deformable member, such as a steel roll. Hard wood, metal and relatively hard, substantially non-deformable rubber may be employed for the roll 18. The rolls 16 and 18 are illustrated in closed position in Fig. 5 in the performance of a metal transforming operation, which is carried out by translating the section 10 between the rolls. The upper, non-deformable roll 18 controls the extent to which the arcuate portion 14 is transformed or increased in length across its subtending chord. The deformable roll 16 is preferably selected in the shape or cross section to lie within the included angle between the diverging legs of a V-formation between the marginal edges of a member 10 before and after a transformation operation thereon, and is deformed under pressure, as indicated in Fig. 5, to produce the widened and slightly flattened structural member 20.

The transformed shape, or section 20, discharged from the rolls 16 and 18 of Fig. 5, is charged between the pair of spaced rolls 21 and 22 of Fig. 6 to further increase its cross-sectional width. The upper roll 22 of this pair of rolls is also non-deformable and is provided with a concave or grooved surface of larger radius or flatter concave curvature than the previous non-deformable roll 18. The lower deformable roll 21 is again shaped to fall within the included angle between the diverging legs of the section 20 before and after a transformation operation. The rolls 21 and 22 are closed (Fig. 7) to compress the section 20 to the extent that the concave surface of the upper roll 22 bears across its full width on the arcuate portion of section 20 to transform the same to section 30.

Figs. 8 and 9 show further flattening or transformation of section 30 to produce the section 40. The rolls 24 and 26 in this particular instance react in the same manner as each of the previous pairs of rolls, the concavity in the rolling surface of roll 26 being of increased radius to produce a further flattening operation, as illustrated by section 40.

Figs. 10 and 11 illustrate the final step in the production of a substantially flattened section 50 from the section 40. Here the upper non-deformable roll 32 is substantially flat across its face width, as is the deformable lower roll 28. In actual practice it is normal to supply sufficient pressure to depress the upper roll 32 and the section 40 into the deformable resilient supporting roll 28 to produce a slight degree of reverse bending in the section 50 (Fig. 11). This reverse bending or curvature is controlled within the elastic limit of the metal of the section 50 to the extent that the section will return to horizontal flatness on release of the pressure exerted by co-acting rolls 28 and 32.

It is to be observed that the integral arcuate connecting link between the angularly disposed legs of the sections 10, 20, 30 and 40 is the only portion of the section that is transformed in the working steps illustrated in Figs. 4 through 11. The arcuate connecting link 14 in all instances lies between the adjacent surfaces of the stiffening ribs 12 flanking the same, and substantially no metal is transformed in respect to any other portion of the extruded members undergoing transformation or flattening, and particularly those portions of the extruded section immediately beneath or beyond the flanking ribs of the aforesaid arcuate connecting links.

It has been determined from actual practice that the upper non-deformable rolls 18, 22, 26 and 32 should preferably be of slightly less width than the distance between the adjacent faces of the ribs 12 flanking the arcuate connecting links and so limit their contact with the upper curved surfaces of the sections 10, 20, 30 and 40. It has also been determined in actual practice of the invention in the light metal field, represented by aluminum, magnesium and their alloys, that the lower deformable rolls 16, 21, 24 and 28 should be preferably selected in a width to provide a resilient support of about at least $8\sqrt{t}$, where "$t$" is the maximum thickness of the arcuate connecting web or link 14 within a thickness range of .05" to .5". Regardless of the metal being worked upon, it is preferred to equally divide the lower resilient roll width on either side of the center of radius of an arcuate connecting link 14. This relationship between the roll widths has resulted in smooth transformation of substantially V sections, typified by Figs. 1, 2, and 3, to the substantially flat section 50, in the absence of concave axial grooved formations beneath the ribs 12. Consistent commercially acceptable results have been obtained in the light metal field employing upper steel rolls and lower deformable rolls employing rubber having a hardness reading of 35 to 70 durometer.

The invention is not limited to any particular metal or alloy and is equally applicable to the transformation of metals and alloys that submit to working in a cold condition, as distinguished from working at elevated temperatures. High strength aluminum alloy structural sections for aircraft use and construction have been fabricated by the process and steps defined above, in the absence of the aforementioned axially disposed concavities beneath the stiffening ribs, starting from substantially V-shaped extrusions produced in regularly employed extrusion equipment. The fact that regularly employed extrusion equipment is mentioned herein is significant since an extrusion press of relatively low capacity and size can be employed in producing V-shaped sections which can be flattened to provide structural members of a width greatly in excess of any flat section producible in the initially employed extrusion equipment. For example, flattened sections have been produced, in accordance with the invention, at least 160 percent of the width or diameter of the extrusion press billet cylinder employed in initially extruding the V-shaped sections.

It is not an essential requirement of the process of the invention that the starting section be confined to a single V-shaped section. It is only necessary that the starting section be such that the flattening or transformation operations be confined to integral arcuate connecting links or webs that are devoid of outwardly extending stiffening ribs over the cross-sectional length undergoing a transformation or flattening operation.

It should be observed that the progressive transformation, in accordance with the practice of the invention, entails progressive deformation or transformation of an arcuate connecting length of the section between adjacent, outwardly extending, integral stiffening ribs, or adjacent a single stiffening rib, as distinguished from any deformation or transformation of a metal web immediately below a stiffening rib. The transformation or deformation is confined entirely to the arcuate web of the section and need not be progressive in the case where a single transformation step is sufficient, as in the transformation from the extruded section of Fig. 4 to that of Fig. 6. It should also be observed that the deformation or transformation steps illustrated in Figs. 5, 7, 9 and 11 actually deform the sections to a degree slightly in excess of that required in order that the sections may spring back on release of the deforming pressure applied by the co-acting transforming rolls. Extruded sections have been specifically referred to as the initial products to be transformed. It will be understood that rolled or otherwise formed initial products will respond to the practices of the invention.

The invention having been described and illustrated in terms of a specific application, it is to be understood that it should not be limited, except as defined in the appended claims.

What is claimed is:

1. In a pressure exerting apparatus for transforming and increasing the cross sectional width of a web plate structural member characterized by a V-formation between its marginal edges, an integral arcuate link connecting diverging legs of the V-formation and at least one integral outwardly extending stiffening rib located on one of the diverging legs beyond the arcuate connecting link, said apparatus comprising a pair of relatively movable pressure-applying members shaped to receive and engage therebetween the arcuate connecting link on its outer curved surface and underside thereof, one of said members being initially engageable with the outer curved surface of the arcuate connecting link substantially centrally on an arcuate length thereof and having a concave hard and rigid surface the curvature of which is of greater radius than the curvature of the outer surface of the connecting link initially engaged thereby, said second member being of rigid construction and having a resiliently deformable body portion projecting between the diverging legs of the web plate structural member and initially engageable with the underside of the diverging legs at spaced points on either side of the concave member, said resiliently deformable body portion being of rubber of a durometer hardness reading from 35 to 70, and said members being adjustable towards each other into complete pressure engagement of the concave surface of the first member with the outer curved surface of the web plate structural member underlying the same against the deformable rubber body portion of the second member over its entire width.

2. In a pressure exerting apparatus for transforming and increasing the cross sectional width of a web plate structural member characterized by a V-formation between its marginal edges, an integral arcuate link connecting diverging legs of the V-formation and at least one integral outwardly extending stiffening rib located on one of the diverging legs beyond the arcuate connecting link, said apparatus comprising a pair of relatively movable pressure-applying rolls shaped to receive and engage therebetween the arcuate connecting link on its outer curved surface and underside thereof, one of said rolls being initially engageable with the outer curved surface of the arcuate connecting link substantially centrally of an arcuate length thereof and having a concave hard and rigid surface the curvature of which is of greater radius than the curvature of the outer surface of the connecting link initially engaged thereby, said second roll comprising a rigid hub capped by a peripheral body portion of resiliently deformable rubber of a durometer hardness reading from 35 to 70 projecting between the diverging legs of the web plate structural member and being initially engageable with the underside of the diverging legs at spaced points on either side of the concave roll, and said rolls being adjustable towards each other into complete arcuate pressure engagement of the concave surface of the first-mentioned roll on the outer curved surface of the web plate structural member underlying the same against the deformable rubber body portion of the second-mentioned roll over an uninterrupted face width thereof.

References Cited in the file of this patent

UNITED STATES PATENTS

| | | |
|---|---|---|
| 494,603 | Shipway | Apr. 4, 1893 |
| 837,707 | Mouterde | Dec. 4, 1906 |
| 926,253 | Hyde | June 29, 1909 |
| 1,032,907 | Hyde | July 16, 1912 |
| 1,580,236 | Ericksson | Apr. 13, 1926 |
| 1,891,740 | Westerman | Dec. 20, 1932 |
| 2,454,282 | Johnson | Nov. 23, 1948 |
| 2,458,686 | Davies, Jr. | Jan. 11, 1949 |
| 2,600,442 | Stanius | June 17, 1952 |
| 2,681,734 | Braeuninger | June 22, 1954 |

FOREIGN PATENTS

| | | |
|---|---|---|
| 187,301 | Great Britain | Oct. 13, 1922 |
| 440,387 | Germany | Feb. 5, 1927 |
| 584,593 | Germany | Sept. 21, 1933 |
| 497,934 | Great Britain | Dec. 28, 1937 |